(12) United States Patent
Zhang et al.

(10) Patent No.: US 12,413,150 B2
(45) Date of Patent: Sep. 9, 2025

(54) SWITCHING MODE POWER SUPPLY WITH ZERO VOLTAGE SWITCHING AND THE METHOD THEREOF

(71) Applicant: Zhejiang University, Hangzhou (CN)

(72) Inventors: Junming Zhang, Hangzhou (CN); Zhen Zhang, Nanjing (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 100 days.

(21) Appl. No.: 17/909,562

(22) PCT Filed: Feb. 23, 2021

(86) PCT No.: PCT/CN2021/077342
§ 371 (c)(1),
(2) Date: Sep. 6, 2022

(87) PCT Pub. No.: WO2021/179900
PCT Pub. Date: Sep. 16, 2021

(65) Prior Publication Data
US 2023/0109722 A1    Apr. 13, 2023

(30) Foreign Application Priority Data
Mar. 7, 2020    (CN) .......................... 202010153879.9

(51) Int. Cl.
*H02M 3/335*    (2006.01)
*H02M 1/00*    (2006.01)

(52) U.S. Cl.
CPC ..... *H02M 3/33523* (2013.01); *H02M 1/0058* (2021.05); *H02M 3/33592* (2013.01)

(58) Field of Classification Search
CPC ......... H02M 3/33523; H02M 3/33576; H02M 3/33584; H02M 3/33592; H02M 1/0058
See application file for complete search history.

(56) References Cited

U.S. PATENT DOCUMENTS

| | | |
|---|---|---|
| 5,309,344 A | 5/1994 | Smith |
| 8,102,680 B2 | 1/2012 | Ren |
| 8,238,123 B2 | 8/2012 | Zhang |
| 8,971,061 B2 | 3/2015 | Li |
| 9,093,909 B2 | 7/2015 | Wang |
| 9,397,577 B2 | 7/2016 | Wang |
| 9,407,151 B2 | 8/2016 | Zhang |
| 9,444,357 B1 * | 9/2016 | Matthews ........... H02M 3/3353 |
| 9,590,518 B2 | 3/2017 | Yan |

(Continued)

FOREIGN PATENT DOCUMENTS

| | | |
|---|---|---|
| CN | 106033929 A | 10/2016 |
| CN | 110380618 A | 10/2019 |

(Continued)

OTHER PUBLICATIONS

International Search Report for PCT Application No. PCT/CN2021/077342, mailed May 27, 2021, (3 pages).

*Primary Examiner* — Alex Torres-Rivera
(74) *Attorney, Agent, or Firm* — NIXON PEABODY LLP

(57) ABSTRACT

A switching mode power supply with zero voltage switching is discussed. It adopts a first secondary signal generator and a second secondary signal generator to control a secondary switch circuit to be turned on once again after a current freewheeling process is over.

14 Claims, 11 Drawing Sheets

(56) References Cited

U.S. PATENT DOCUMENTS

| | | |
|---|---|---|
| 9,595,885 B2 | 3/2017 | Wang |
| 11,424,687 B2 | 8/2022 | Hu |
| 2011/0228570 A1 | 9/2011 | Li |
| 2014/0043863 A1* | 2/2014 | Telefus ............. H02M 3/33576 363/21.04 |
| 2015/0207420 A1* | 7/2015 | Wang ................ H02M 3/33507 363/21.12 |
| 2016/0276945 A1* | 9/2016 | Yan ..................... H02M 3/1588 |
| 2019/0036458 A1* | 1/2019 | Shen ....................... H02M 1/08 |
| 2021/0143743 A1* | 5/2021 | Deng .................... H02M 1/083 |
| 2021/0336525 A1* | 10/2021 | Rui ................... H02M 3/33592 |

FOREIGN PATENT DOCUMENTS

| | | |
|---|---|---|
| CN | 110798075 A | 2/2020 |
| CN | 111277146 A | 6/2020 |

\* cited by examiner

SWITCHING MODE POWER SUPPLY WITH ZERO VOLTAGE SWITCHING AND THE METHOD THEREOF

FIELD

The present invention relates to electronic circuits, more specifically, the present invention relates to switching mode power supply, the control circuit and the method thereof.

BACKGROUND

As the fast development of the information technology, variable electronic devices are widely used, such as cell phones, portable computers, etc. Such electric devices typically adopt external adapters (or chargers) to provide power supply. An adapter converts an AC input voltage into a DC output voltage, .e., an AC input voltage with 50 Hz frequency and 220V rms voltage (or 110V rms/60 Hz) is converted into a low DC voltage (e.g. a 5V DC output) with electrical isolation (i.e. galvanic isolation). A typical topology is a flyback converter. Conventional adapter power supplies sample the output voltage at an output port and feed the sampled voltage back to maintain the output voltage stable. Because of the isolation between the input and the output, electrical isolation is needed for the feedback circuit, e.g., an opto-coupler is usually used. As higher and higher power consume, the requirement for internal battery capability is also getting higher and higher. Due to the volume limitation of the electronic device, the battery capability is also limited. Consequently, fast-charging technology is emerged, which charges the battery fast to counteract the limitation of the battery capability. And more output power is needed for the adapter with fast-charge technology. How to deliver more output power with same volume (i.e. higher power density) has become a challenge. In order to achieve higher power density, the switching frequency should be increased to reduce the size of the passive components, and the adapter efficiency should be also increased at the same time. Thus, how to increase the efficiency of the converter is a continuous effort needed for the field.

SUMMARY

It is an object of the present invention to provide an improved switching mode power supply, a secondary control circuit used in a switching mode power supply and a method used thereof, to solve the above problems.

In accomplishing the above and other objects, there has been provided, in accordance with an embodiment of the present invention, a switching mode power supply, comprising: a primary power switch, coupled to a primary side of an electrical isolation device, wherein the primary power switch is controlled to be periodically turned on and off, to deliver an input voltage to a secondary side of the electrical isolation device; a secondary switch circuit, coupled to a secondary side of the electrical isolation device, wherein the secondary switch circuit is controlled to be periodically turned on and off, to provide an output voltage; and a secondary control circuit, configure to provide a secondary control signal, to control the secondary switch circuit, so that: when a current flowing through the secondary switch circuit is detected, the secondary switch circuit is controlled to be turned on to freewheel the current, until a current freewheeling process is over; and the secondary switch circuit is controlled to be turned on once again in one switching cycle after the current freewheeling process is over and before the primary power switch is turned on at a next switching cycle.

In addition, there has been provided, in accordance with an embodiment of the present invention, a switching mode power supply, comprising: a primary power switch, coupled to a primary side of an electrical isolation device, wherein the primary power switch is controlled to be periodically turned on and off, to deliver an input voltage to a secondary side of the electrical isolation device; a secondary switch circuit, coupled to a secondary side of the electrical isolation device, wherein the secondary switch circuit is controlled to be periodically turned on and off, to provide an output voltage; and a secondary control circuit, configure to provide a secondary control signal, to control the secondary switch circuit, so that: the secondary switch circuit is controlled to be turned on with a first current direction flowing therethrough to freewheel a current after the primary power switch is turned off, until a current freewheeling process is over; and the secondary switch circuit is controlled to be turned on once again with a second current direction flowing therethrough in one switching cycle after the current freewheeling process is over and before the primary power switch is turned on at a next switching cycle. The second current direction is opposite with the first current direction.

Furthermore, there has been provided, in accordance with an embodiment of the present invention, a secondary control circuit used in a switching mode power supply. The switching mode power supply includes a primary power switch and a secondary switch circuit. The secondary control circuit comprises: a first secondary signal generator, configured to detect a current flowing through the secondary switch circuit, and to control the secondary switch circuit to freewheel the current when the current flowing therethrough is detected, until a current freewheeling process is over; and a second secondary signal generator, configured to generate a control signal to control the secondary switch circuit to be turned on once again after the current freewheeling process is over and before the primary power switch is turned on at a next switching cycle.

Furthermore, there has been provided, in accordance with an embodiment of the present invention, a method used in a switching mode power supply. The switching mode power supply includes a primary power switch coupled to a primary side of an electrical isolation device, and a secondary switch circuit coupled to a secondary side of the electrical isolation device. The method comprises: receiving an input voltage at the primary side and generating an output voltage at the secondary side by controlling the primary power switch and the secondary switch circuit to be ON and OFF; feeding back and processing the output voltage to generate an error signal, wherein the error signal being delivered to the primary side via an isolate feedback unit, to control a turning off of the primary power switch; detecting a current flowing through the secondary switch circuit, and starting a first ON process of the secondary switch circuit to perform a current freewheeling process when there is current flowing therethrough is detected, until the current falls to zero; and starting a second ON process of the secondary switch circuit in response to a first condition after the current freewheeling process is over; and turning on the primary power switch after a dead time delay since the second ON process of the secondary switch circuit is over.

The switching mode power supply, the secondary control circuit and the control method thereof discussed above use secondary side control. By turning on the secondary switch circuit twice, a body diode is ON before the primary power switch is turned on. Thus, zero voltage switching at the primary side is realized, which lowers the loss.

The use of the similar reference label in different drawings indicates the same of like components.

DETAILED DESCRIPTION

Embodiments of circuits for switching mode power supply are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
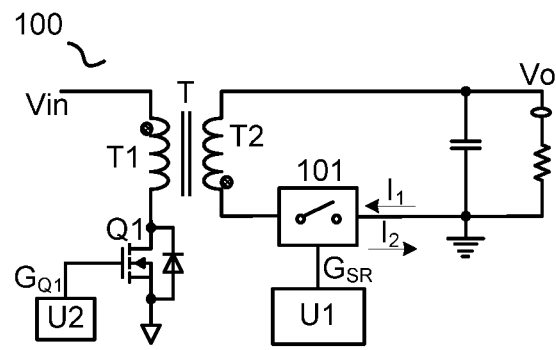
FIG. 1 schematically shows a switching mode power supply 100 in accordance with an embodiment of the present invention.

FIG. 1 schematically shows a switching mode power supply 100 in accordance with an embodiment of the present invention. In the example of FIG. 1, the switching mode power supply comprises: a primary power switch Q1, coupled to a primary side T1 of an electrical isolation device T, the primary power switch Q1 being periodically turned on and off, to deliver an input voltage Vin into a secondary side T2 of the electrical isolation device T; a secondary switch circuit 101, coupled to the secondary side T2 of the electrical isolation device T, the secondary switch circuit 101 being periodically turned on and off, to provide a desired output voltage $V_O$; and a secondary control circuit U1, configured to provide a secondary control signal $G_{SR}$, to control the secondary switch circuit 101, so that: when the primary power switch Q1 is OFF, the secondary switch circuit 101 is operable to freewheel a current until the current falls to zero; and after a current freewheeling process is over and before the primary power switch Q1 is turned on at a next switching cycle, the secondary switch circuit 101 is turned on once again and keeps ON for a period of time.

In one embodiment of the present invention, at one switching cycle, when a current flowing through the secondary switch circuit 101 is detected, the secondary switch circuit 101 is controlled to be turned on (i.e. to start a first ON process), until the current reaches zero or nears zero (i.e., until the current freewheeling process is over); and the secondary switch circuit 101 is controlled to be turned on once again (i.e., to start a second ON process) at one switching cycle after the current freewheel process is over and before the primary power switch Q1 is turned on at the next switching cycle.

In one embodiment of the present invention, when the secondary switch circuit 101 is freewheeling, the current flowing therethrough has a first direction (shown as $I_1$ in FIG. 1); and when the secondary switch circuit 101 is turned on once again after the current freewheeling process is over, the current flowing therethrough has a second direction (shown as I2 in FIG. 1) opposite to the first direction. That is, when the current flowing through the secondary switch circuit 101 is detected, the secondary switch circuit 101 is controlled to be turned on with a first current direction, until the current reaches zero or nears zero; and after the current freewheel process ends and before the primary power switch Q1 is turned on at the next switching cycle, the secondary switch circuit 101 is controlled to be turned on once again with a second current direction.

In one embodiment of the present invention, after the current freewheeling process is over and before the primary power switch Q1 is turned on at the next switching cycle, the secondary switch circuit 101 is controlled to be ON once again for a preset time period, i.e., to be ON for a preset time length. In other embodiments of the present invention, the ON time is determined by a current limit of the current flowing through the secondary switch circuit 101, referring to FIG. 9 and FIG. 10 with specific discussions herein below.

In one embodiment of the present invention, the electrical isolation device T comprises a transformer, having a primary winding and a secondary winding. In one embodiment of the present invention, the electrical isolation device T comprises a piezoelectric transformer.

In one embodiment of the present invention, the primary power switch Q1 comprises a power MOSFET having a body diode and a parasitic capacitor. In other embodiments of the present invention, the primary power switch Q1 may comprise other switch devices, such as BJT, IGBT, etc.

Figure 2:
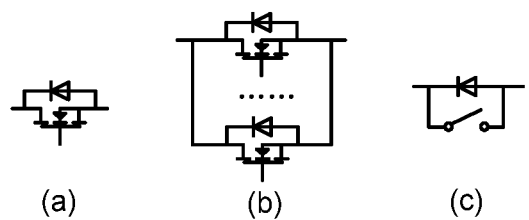
FIG. 2 schematically shows a circuit configuration of the secondary switch circuit 101 in accordance with an embodiment of the present invention.

In one embodiment of the present invention, the secondary switch circuit 101 may comprise a power switch device (e.g. a power MOSFET having a body diode), as shown at the left side (a) of FIG. 2; or the secondary switch circuit 101 may comprise two or more switch devices coupled in parallel, as shown at the middle part (b) of FIG. 2; or the secondary switch circuit 101 may comprise a diode and a switch device coupled in parallel, as shown at the right side (c) of FIG. 2.

In one embodiment of the present invention, the turning on of the secondary switch circuit 101 means all of the switch devices are turned on or part of the switch devices are turned on (e.g., only the diode or the body diode is ON), and a current is flowing therethrough. The turning off of the secondary switch circuit 101 means all of the switch devices are turned off, and no current is flowing therethrough. For example, when the primary power switch is turned off and the secondary switch circuit 101 freewheels the current, part of the switch devices or all of the switch devices of the secondary switch circuit 101 are turned on, with the first current direction; and after the current freewheel process ends and before the primary power switch Q1 is turned on at the next switching cycle, part of the switch devices or all of the switch devices of the secondary switch circuit 101 are turned on once again for a period of time, with the second current direction.

In one embodiment of the present invention, the switching mode power supply 100 further comprises: a primary control circuit U2, configured to generate a primary control signal $G_{Q1}$, to control the primary power switch Q1.

Figure 3:
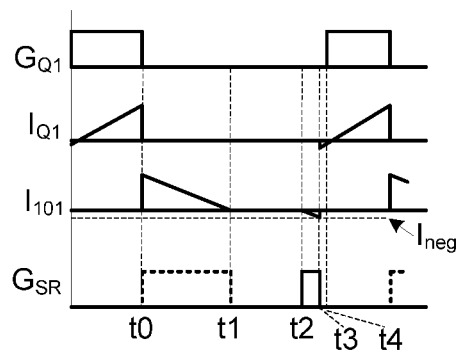
FIG. 3 schematically shows timing waveforms of the primary control signal $G_{Q1}$, a current $I_{Q1}$ flowing through the primary power switch Q1, a current $I_{101}$ flowing through the secondary switch circuit 101, and the secondary control signal $G_{SR}$.

FIG. 3 schematically shows timing waveforms of the primary control signal $G_{Q1}$, a current $I_{Q1}$ flowing through the primary power switch Q1, a current $I_{101}$ flowing through the secondary switch circuit 101, and the secondary control signal $G_{SR}$.

As shown in FIG. 3, before time point to, the primary power switch Q1 is ON, the current flowing through the primary side T1 increases linearly. The process is same as that of the prior flyback converter.

At time point to, the primary power switch Q1 is turned off, and the secondary switch circuit 101 starts to freewheel the current, with the first current direction. As shown in FIG. 3, the current direction is positive.

At time point t1, the current flowing through the secondary switch circuit 101 falls to zero, and the current freewheeling process is over. During the current freewheeling process, if a diode is used to freewheel the current, no secondary control signal $G_{SR}$ is needed to turn on the secondary switch circuit 101. As shown in FIG. 3, the secondary control signal $G_{SR}$ is shown as dashed line during this time interval.

At time point t4, the primary power switch Q1 is turned on at the next switching cycle. At time point t2, which is ahead of time point t4, the secondary switch circuit 101 is controlled to be turned on for a period of time (from t2 to t3) by the secondary control signal $G_{SR}$. As shown in FIG. 3, the current direction of the current flowing through the secondary switch circuit 101 during time interval t2-t3 is negative, i.e., the second current direction is negative.

During time interval t2-t3, the negative current flowing through the secondary switch circuit 101 charges a magnetizing inductance of the transformer, causing a voltage drop of the primary power switch Q1 to decrease, and the body diode of the primary power switch Q1 to be ON. Thus the voltage drop of the primary power switch Q1 at time point t4 is equal to a voltage drop (approximate −0.7V) of the body diode, which is close to zero. Consequently, the foregoing switching mode power supply 100 realizes zero voltage switching (ZVS) of the primary power switch, which lows the power loss.

Figure 4:
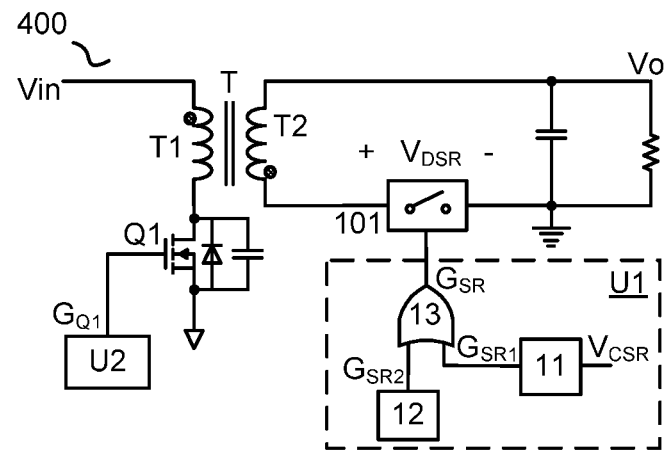
FIG. 4 schematically shows a switching mode power supply 400 with a detailed circuit configuration of the secondary control circuit U1 in accordance with an embodiment of the present invention.

FIG. 4 schematically shows a switching mode power supply 400 with a detailed circuit configuration of the secondary control circuit U1 in accordance with an embodiment of the present invention. In the example of FIG. 4, the secondary control circuit U1 comprises: a first secondary signal generator 11, configured to generate a first control signal $G_{SR1}$ in response to a current sense signal $V_{CSR}$ indicative of the current flowing through the secondary switch circuit 101, to control the secondary switch circuit 101's current freewheel process (i.e., the secondary switch circuit 101's first ON process); and a second secondary signal generator 12, configured to generate a second control signal $G_{SR2}$, to control the secondary switch circuit 101 to be turned on once again (to start the second ON process) in one switching cycle.

In one embodiment of the present invention, when the current sense signal $V_{CSR}$ indicates that a current is flowing through the secondary switch circuit 101, the secondary switch circuit 101 is turned on by the first control signal $V_{SR1}$; and when the current sense signal $V_{CSR}$ indicates that the current flowing through the secondary switch circuit 101 is zero or is approaching zero, the secondary switch circuit 101 is turned off by the first control signal $V_{SR1}$.

In one embodiment of the present invention, the switching mode power supply 400 further comprises: a logical OR unit 13, configured to perform logical OR operation on the first control signal $G_{SR1}$ and the second control signal $G_{SR2}$, to generate the secondary control signal $G_{SR}$.

In one embodiment of the present invention, when a current is detected flowing through the secondary switch circuit 101, the secondary switch circuit 101 is turned on, until the current reaches zero. That is, the secondary control circuit U1 is configured to provide the secondary control signal to control the secondary switch circuit 101, so that: when a current is detected flowing through the secondary switch circuit 101, the secondary switch circuit 101 is turned on, until the current freewheeling process is over (i.e., until when the current flowing therethrough approaches zero); and after the current freewheeling process ends and before the primary power switch Q1 is turned on at the next switching cycle, the secondary switch circuit 101 is controlled to be turned on once again for a period of time.

That is, in one embodiment of the present invention, a secondary control circuit U1 is discussed, which is used in a switching mode power supply, the switching mode power supply including a primary power switch Q1 coupled to a primary side, and a secondary switch circuit 101 coupled to a secondary side, the secondary control circuit U1 comprising: a first secondary signal generator 11, configured to detect a current flowing through the secondary switch circuit 101, and to control the secondary switch circuit 101 to freewheel the current with a first current direction when the current flowing through the secondary switch circuit 101 is detected, until the current freewheeling process is over; and a second secondary signal generator 12, configured to control the secondary switch circuit to be turned on once again after the current freewheeling process ends and before the primary power switch Q1 is turned on at the next switching cycle, with a second current direction opposite to the first current direction.

In one embodiment of the present invention, the current sense signal $V_{CSR}$ comprises a voltage drop $V_{DSR}$ of the secondary switch circuit 101. When the voltage $V_{DSR}$ is lower than a first threshold $V_{th1}$ (e.g. −0.1V), the secondary switch circuit 101 is turned on, until the current flowing therethrough reaches zero. In one embodiment of the present invention, the zero condition may also be detected by the voltage $V_{DSR}$. When the voltage $V_{DSR}$ is higher than a second threshold $V_{th2}$ (e.g. −0.01V), which is close to zero, indicating the current flowing therethrough approaches zero, the secondary switch circuit 101 is turned off. Specifically, when there is a current flowing through the secondary switch circuit 101, because the secondary switch circuit 101 is not turned on at first, the current would flow through the body diode. Then the voltage drop the body diode would cause $V_{DSR}$ to be lower than $V_{th1}$, which indicates there is current flowing through the body diode of the secondary switch circuit 101, so the secondary switch circuit 101 is turned on accordingly. When the secondary switch circuit 101 is turned on, the corresponding voltage $V_{DSR}$ across the secondary switch circuit 101 is proportional to the current. When the current approaches zero, $V_{DSR}$ is small. When it is higher than $V_{th2}$, indicating the current flowing through the secondary switch circuit 101 is approaching zero, the secondary switch circuit 101 is turned off.

In other embodiments of the present invention, the current sense signal $V_{CSR}$ may be obtained by other ways, e.g., the current sense signal may be obtained by sensing a voltage across a sense resistor coupled in series with the secondary switch circuit, or the current sense signal may be obtained by sensing a switch device which flows through a current that is mirrored and/or proportional with the current flowing through the secondary switch circuit.

In one embodiment of the present invention, the second secondary signal generator 12 is configured to generate the second control signal $G_{SR2}$ in response to a trigger condition; and the secondary switch circuit 101 is turned on once again in one switching cycle in response to the second control signal $G_{SR2}$. In one embodiment of the present invention, when $V_{DSR}$ is lower than a set threshold (e.g., a third threshold), the second secondary signal generator 12 is trigged to generate the second control signal $G_{SR2}$. In other embodiments of the present invention, when the present switching frequency (or the present switching cycle) reaches a reference switching frequency (or a reference switching cycle), the second secondary signal generator 12 is trigged to generate the second control signal $G_{SR2}$. The reference switching frequency (or the reference switching cycle) may be set by the system, or may be related to the output voltage $V_O$.

Figure 5:
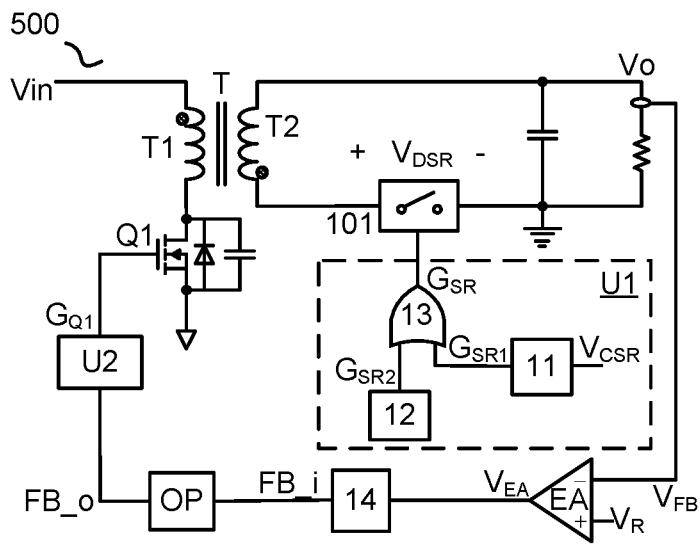
FIG. 5 schematically shows a switching mode power supply 500 in accordance with an embodiment of the present invention.

FIG. 5 schematically shows a switching mode power supply 500 in accordance with an embodiment of the present invention. The 500 in FIG. 5 is similar as the switching mode power supply 400 in FIG. 4, with a difference that the switching mode power supply 500 schematically shows the control to the primary power switch Q1. Specifically, in the example of FIG. 5, the switching mode power supply 500 further comprises: a feedback controller 14, configured to generate an isolate feedback signal FB_i in response to the output voltage $V_O$ (e.g. in response to an error signal $V_{EA}$ indicative of the output voltage $V_O$); an isolate feedback unit OP, configured to generate a feedback output signal FB_o in response to the isolate feedback signal FB_i; and a primary control circuit U2, configured to generate the primary control signal $G_{Q1}$ to control the primary power switch Q1.

In the example of FIG. 5, the switching mode power supply 500 further comprises: an error amplifier EA, configured to amplify and integrate a difference between a reference voltage $V_R$ and a feedback voltage $V_{FB}$ indicative of the output voltage $V_O$, to generate the error signal $V_{EA}$.

Figure 6:
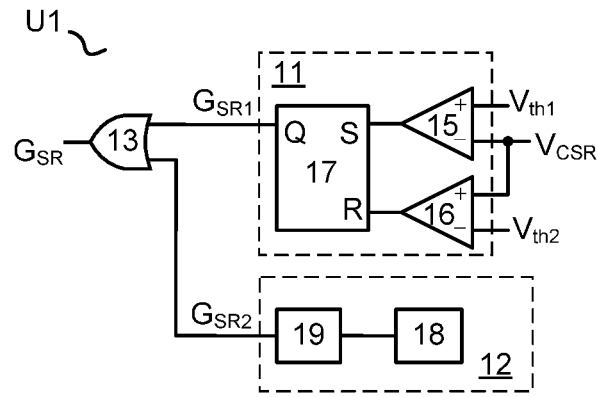
FIGS. 6-10 schematically shows different circuit configurations of the secondary control circuit U1 in accordance with embodiments of the present invention.

FIG. 6 schematically shows a circuit configuration of the secondary control circuit U1 in accordance with an embodiment of the present invention. In the example of FIG. 6, the first secondary signal generator 11 comprises: a first comparator 15, configured to compare the current sense signal $V_{CSR}$ with the first threshold $V_{th1}$; a second comparator 16, configured to compare the current sense signal $V_{CSR}$ with the second threshold $V_{th2}$; and a first logical circuit 17, configured to generate the first control signal $G_{SR1}$ in response to the comparison results of the first comparator 15 and the second comparator 16. The second secondary signal generator 12 comprises: a trigger signal generator 18, configured to generate a trigger signal; and a second logical circuit 19, configured to generate the second control signal $G_{SR2}$ in response to the trigger signal.

In one embodiment of the present invention, when the current sense signal $V_{CSR}$ is lower than the first threshold $V_{th1}$, the first logical circuit 17 is set; and when the current sense signal $V_{CSR}$ is higher than the second threshold $V_{th2}$, the first logical circuit 17 is reset. In one embodiment of the present invention, the first logical circuit 17 comprises a RS flip flop.

Figure 7:
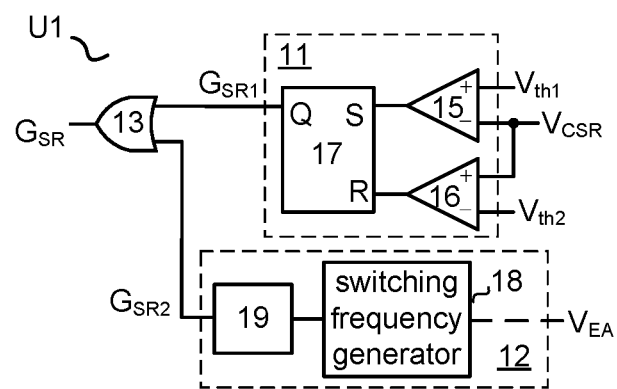
Figure 11:
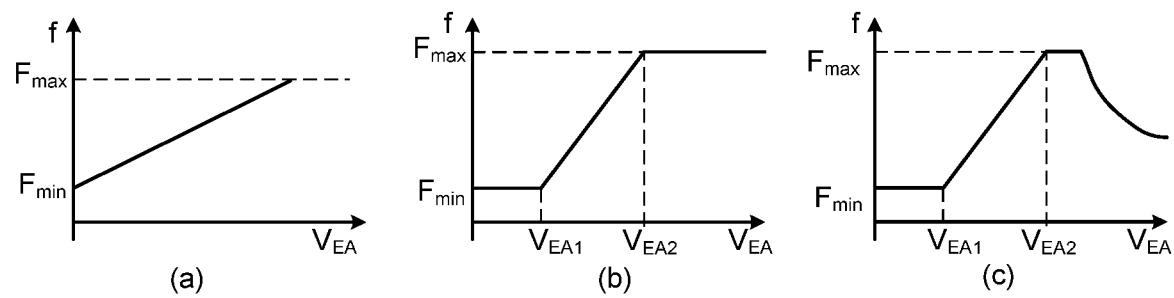
FIG. 11 schematically shows relationships between the switching frequency f and the error signal $V_{EA}$ in accordance with an embodiment of the present invention.

In one embodiment of the present invention, the trigger signal has a fixed frequency, e.g. the trigger signal generator 18 may comprise a switching frequency generator, as shown in FIG. 7. The switching frequency may be set by the system, or may be varied with the error signal $V_{EA}$. In the example of FIG. 7, the switching frequency generator may be configured to receive the error signal $V_{EA}$ (as shown with dashed line) indicate of the output voltage $V_O$, to generate a switching frequency signal having a frequency determined by the error signal. The frequency may decrease as $V_{EA}$ decreases, or may have different variations corresponding to different error signals $V_{EA}$, referring to FIG. 11. As shown in the left side (a) of FIG. 11, the frequency f of the switching frequency signal decreases from a maximum frequency Fmax to a minimum frequency $F_{min}$ as $V_{EA}$ decreases. In the middle part (b) of FIG. 11, the frequency f of the switching frequency signal has different variations as the error signal $V_{EA}$ is at different regions: the frequency f is limited at the minimum frequency $F_{min}$ when the error signal $V_{EA}$ is lower than $V_{EA1}$; the frequency f decreases as the decrease of the error signal $V_{EA}$ when the error signal $V_{EA}$ is between $V_{EA1}$ and $V_{EA2}$; and the frequency f is limited at the maximum frequency Fmax when the error signal $V_{EA}$ is higher than $V_{EA2}$.

Figure 8:
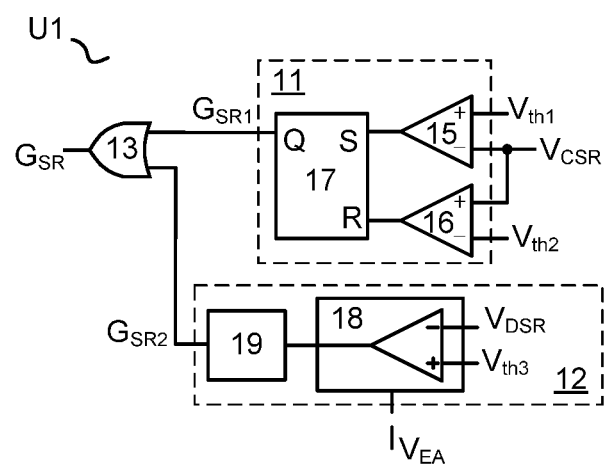

In one embodiment of the present invention, the trigger signal may be generated in response to the voltage $V_{DSR}$ drop the secondary switch circuit 101. Because the system operates at discontinuous current mode or critical current mode, the voltage $V_{DSR}$ starts to oscillate when the current flowing through the secondary switch circuit 101 falls to zero, with an oscillation center at the output voltage $V_O$. Thus, the trigger signal may be generated by detecting a valley value of $V_{DSR}$ to further reduce the power loss. When $V_{DSR}$ is lower than the third threshold $V_{th3}$ (i.e., the set threshold), 101 is turned on (the well-known "valley turn-on" technology). As shown in FIG. 8, the trigger signal generator 18 comprises a valley detection circuit, configured to compare $V_{DSR}$ with the third threshold $V_{th3}$, when $V_{DSR}$ is lower than the third threshold $V_{th3}$, the trigger signal is generated. In one embodiment of the present invention, the valley detection circuit may also compare a time variation of $V_{DSR}$ (i.e., $dV_{DSR}/dt$) with the third threshold $V_{th3}$, to generate the trigger signal. The switching frequency of the system increases with the decrease of the error signal $V_{EA}$ under such valley turn on technology. A maximum frequency is set in order to limit the frequency under light load condition, the corresponding relationship of the system frequency and the error signal $V_{EA}$ is shown as the right side (c) of FIG. 11.

Figure 9:
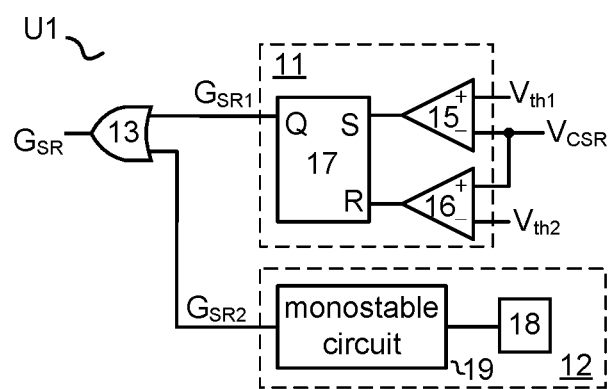
Figure 10:
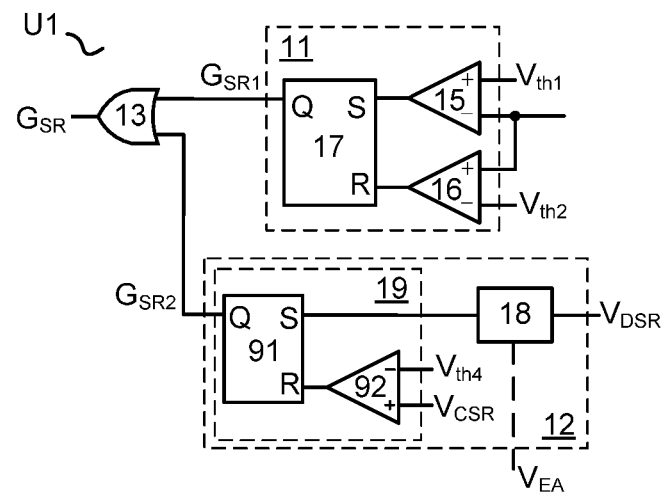

In one embodiment of the present invention, the second logical circuit 19 is configured to generate the second control signal $G_{SR2}$ in response to the trigger signal, to control the secondary switch circuit 101 to be ON for a set time length. In one embodiment of the present invention, the second logical circuit 19 comprises a monostable circuit (as shown in FIG. 9). The monostable circuit is configured to generate a signal with a fixed high level time length in response to the trigger signal, so as to control 101 to be ON for the set time length. In another embodiment of the present invention, the second control signal $V_{SR2}$ may control the ON time length of 101 to be related to the input voltage and/or the output voltage: shorter ON time length under higher output voltage, and shorted ON time length under lower input voltage. In other embodiments of the present invention, the second control signal $V_{SR2}$ may control the ON time length of 101 to be related to the current flowing through 101. As shown in FIG. 10, the second logical circuit 19 comprises: a logical unit 91, configured to be set when the trigger signal is valid; and configured to be reset when the current sense signal $V_{CSR}$ is higher than a current threshold (i.e., a fourth threshold). That is, the logical unit 91 is configured to be set in response to the trigger signal, and to be reset in response to the comparison between the current sense signal $V_{CSR}$ and the current threshold. In the example of FIG. 10, the second logical circuit 19 further comprises: a third comparator 92, configured to compare the current sense signal $V_{CSR}$ with the fourth threshold $V_{th4}$ to reset the logical unit 91.

In one embodiment of the present invention, the feedback controller 14 is configured to deliver the error signal $V_{EA}$ to its output. After a postpone time length (e.g., the well-know dead time in the art, which is typically dozens of nanoseconds or hundreds of nanoseconds) since the secondary switch circuit 101's turning off, the primary power switch Q1 is turned on. That is, the primary power switch Q1 is turned on after a postpone time length from the time point that the secondary switch circuit 101 is turning off. Because the circuit has inherent delay during signal delivery, no extra delay circuit is needed to set the dead time. Thus, the primary control circuit U2 may control the primary power switch Q1 to be turned on in response to the turning off of the secondary switch circuit 101.

Figure 12:
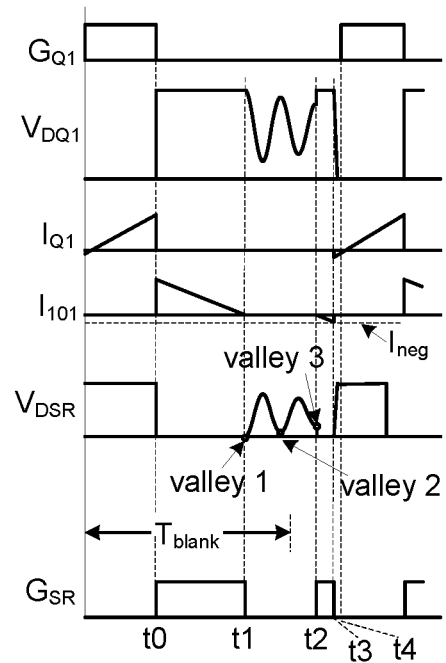
FIG. 12 schematically shows the signal waveforms when the switching mode power supply operates at DCM in accordance with an embodiment of the present invention.
Figure 13:
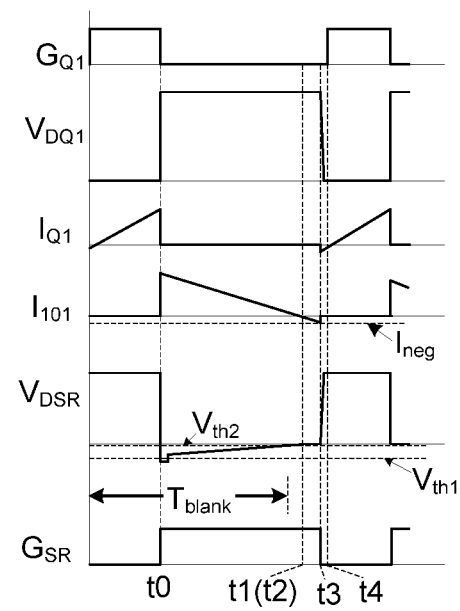
FIG. 13 schematically shows the signal waveforms when the switching mode power supply operates at CRM in accordance with an embodiment of the present invention.

The operation of the switching mode power supply is illustrated below with reference to FIG. 12 and FIG. 13. FIG. 12 schematically shows the signal waveforms when the switching mode power supply operates at DCM, while FIG. 13 schematically shows the signal waveforms when the switching mode power supply operates at CRM, wherein: $G_{Q1}$ represents the primary control signal used to control the primary power switch Q1, $V_{DQ1}$ represents a voltage drop the primary power switch Q1, $I_{Q1}$ represents a current flowing through the primary power switch Q1, $I_{101}$ represents the current flowing through the secondary switch circuit 101, $V_{DSR}$ represents the voltage drop the secondary switch circuit 101, and $G_{SR}$ represents the secondary control signal used to control the secondary switch circuit 101.

Before time point t0, the primary power switch Q1 is ON, a current flowing through the primary side T1 increases linearly. The process is same as that of the prior flyback converter.

At time point t0, the primary power switch Q1 is turned off, which may be trigged when $I_{Q1}$ reaches a current value determined by the feedback output signal FB_o (i.e., determined by the error signal $V_{EA}$), or when the ON time of the primary power switch Q1 reaches a time value determined by the feedback output signal FB_o (i.e., determined by the error signal $V_{EA}$), etc. The switching mode power supply enters current freewheeling process. The secondary switch circuit 101 has not been turned on yet, while the body diode is turned on due to the transformer coupling effect. Then a current flowing through the secondary switch circuit 101 would be detected, and the secondary switch circuit 101 would be turned on by the first control signal $G_{SR1}$. Specifically, $V_{DSR}$ is equal to the voltage drop the body diode, which is approximately −0.7V, causing $V_{DSR}$ to be lower than $V_{th1}$. So the first logical circuit 17 is reset, and the secondary switch circuit 101 is turned on. Then $V_{DSR}$ is proportional to the current flowing through the secondary switch circuit 101, and gradually increases from a negative value as the current decreases.

At time point t1, the current flowing through the secondary switch circuit 101 falls to zero, and the secondary switch circuit 101 is turned off. Specifically, the current flowing through 101 is deemed as zero when $V_{DSR}$ is higher than the second threshold $V_{th2}$ (e.g. −10 ml). Then the output of the second comparator 16 turns to high, which resets the first logical circuit 17, and the secondary switch circuit 101 is turned off. The current freewheeling process ends.

The time interval from time point t0 to time point t1 is called the current freewheeling stage, and the control scheme to the secondary switch circuit 101 is similar as that in the prior synchronous rectifier. The embodiments from FIG. 6 to FIG. 10 are merely discussed for illustration purpose, one skilled in the art should realize that other control schemes may also be adopted, to turn on the secondary switch circuit 101 when a current flowing therethrough is detected, and to turn off the secondary switch circuit 101 when the current falls to zero.

Figure 18:
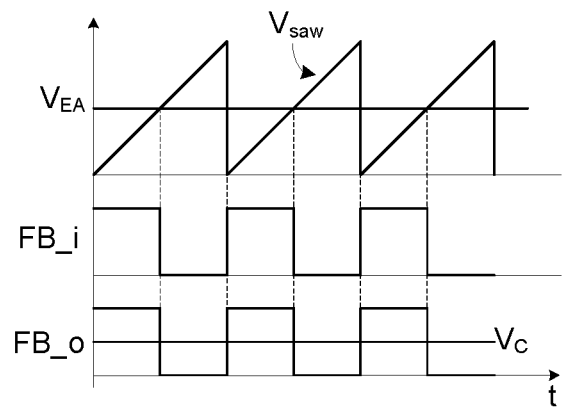
FIG. 18 schematically shows the waveforms of the error signal $V_{EA}$, the triangular wave signal $V_{saw}$, the isolate feedback signal FB_i, and the feedback output signal FB_o in the example of FIG. 17.

During time interval t1-t2, the system enters to DCM or CRM because the current flowing through the secondary switch circuit 101 has fallen to zero. If a trigger signal is provided, the secondary switch circuit 101 is turned on once again in one switching cycle. For example, if the switching frequency generator 18 in FIG. 7 indicates that the present switching frequency (the present switching cycle) reaches the reference switching frequency (the reference switching cycle), the trigger signal is generated, and the secondary switch circuit 101 is turned on once again; or as shown in FIG. 18, when the voltage $V_{DSR}$ across the secondary switch circuit 101 is zero, which is detected by the valley detection circuit 18, the trigger signal is generated, and the secondary switch circuit 101 is turned on once again. The waveforms shown in FIG. 12 and FIG. 13 are the waveforms when the switching mode power supply adopts the valley detection technology.

In real applications, in order to limit the frequency under light load condition, the secondary control circuit U1 typically generates a maximum frequency limitation signal (i.e., a minimum switching cycle signal) in response to the error signal $V_{EA}$, which is shown as $T_{blank}$ in FIG. 12 and FIG. 13. If the oscillation valley of $V_{DSR}$ shows up within $T_{blank}$, the valley information is neglected, until $T_{blank}$ is over. As shown in FIG. 12, the first and second oscillation valleys of $V_{DSR}$ both show up within $T_{blank}$, both of which are neglected. Until $T_{blank}$ is over, i.e., at time point t4, the trigger signal is generated in response to the third oscillation valley of $V_{DSR}$, and the secondary switch circuit 101 is turned on once again. And in the example of FIG. 13, $T_{blank}$ ends before the current freewheeling process is over, i.e., before time point t1. Thus, once the current freewheeling process ends, the trigger signal is generated due to the zero voltage of $V_{DSR}$, and the secondary switch circuit 101 is turned on once again. Under such condition, time points t1 and t2 are overlapped with each other. That is, the secondary switch circuit 101 has the ending time point (t1) of the current freewheeling process be overlapped with the start time point (12) of the second ON process. As shown in FIG. 13, the first control signal $G_{SR1}$ and the second control signal $G_{SR2}$ are in one line without disconnection.

Figure 19:
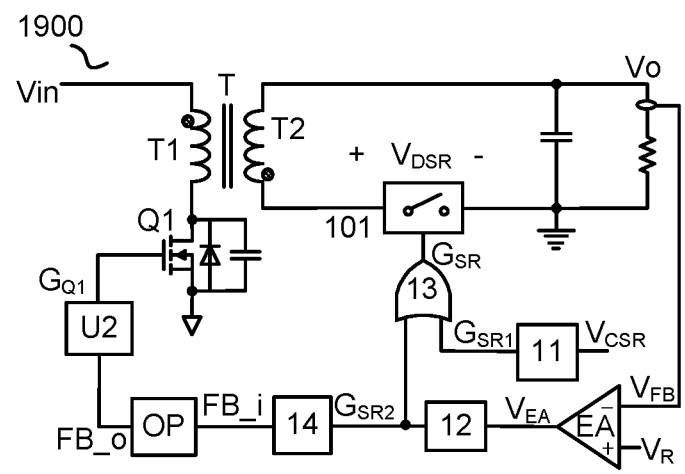
FIG. 19 schematically shows a switching mode power supply 1900 in accordance with an embodiment of the present invention.

The trigger signal is delivered to the second logical circuit 19. If the second logical circuit 19 comprises a monostable circuit, as shown in FIG. 19, the monostable circuit generate the second control signal $G_{SR2}$ in response to the trigger signal. Then the current flows from the secondary switch circuit 101's drain to its source, which means the current direction is negative, as shown in FIG. 12 and FIG. 13. This negative current charges the magnetizing inductance of the transformer inversely. Because the pulse signal generated by the monostable circuit has a set time length, the ON time length of 101 (i.e., the charge time length) is a set value. If the second logical circuit 19 comprises the first logical unit 91 and the third comparator 92 as shown in FIG. 10, the ON time of the secondary switch circuit 101 is determined by the current flowing therethrough. For example, when the negative current $I_{101}$ reaches a certain set value, the charge process is over. As shown in FIG. 12 and FIG. 13, when the negative current $I_{101}$ reaches a current limit $I_{neg}$ corresponding to the fourth threshold $V_{th4}$, the secondary switch circuit 101 is turned off, i.e., the second ON process of the secondary switch circuit 101 is over.

As a result, the primary power switch Q1 would be turned on once again at time point t4, which is with an appropriate dead time $T_{dead}$ delay from time point t3, which is after a certain period of time since time point t2. Then the system enters a new switching cycle, and operates as discussed above.

At time point t3, because of the second turning on of the secondary switch circuit 101, the inverse charge current causes the voltage across the primary power switch Q1 to decease, so the body diode of the primary power switch Q1 is turned on. Accordingly, the voltage across the primary power switch Q1 is equal to the ON voltage drop the body diode at time point t4. Thus, several embodiments of the foregoing switching mode power supply achieve zero voltage switching, which decreases the power loss.

Figure 14:
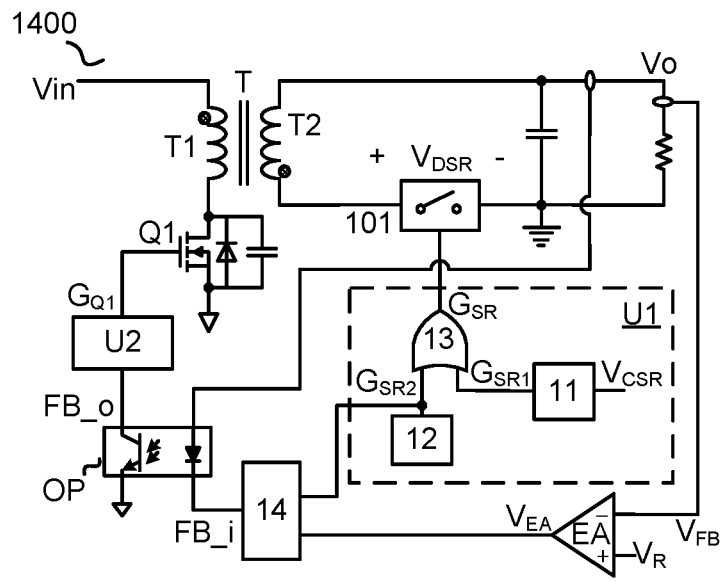
FIG. 14 schematically shows a switching mode power supply 1400 in accordance with an embodiment of the present invention.

FIG. 14 schematically shows a switching mode power supply 1400 in accordance with an embodiment of the present invention. In the example of FIG. 14, the switching mode power supply 14 comprises: a primary power switch Q1, coupled to a primary side T1 of an electrical isolation device T, the primary power switch Q1 being periodically turned on and off, to deliver an input voltage Vin into a secondary side T2 of the electrical isolation device T; a secondary switch circuit 101, coupled to the secondary side T2 of the electrical isolation device T, the secondary switch circuit 101 being periodically turned on and off, to provide a desired output voltage $V_O$; a first secondary signal generator 11, configured to generate a first control signal $G_{SR1}$ in response to a current sense signal $V_{CSR}$ indicative of the current flowing through the secondary switch circuit 101; a second secondary signal generator 12, configured to generate a second control signal $G_{SR2}$, the first control signal $G_{SR1}$ and the second control signal $G_{SR2}$ both being used to control the secondary switch circuit 101; a feedback controller 14, configured to generate an isolate feedback signal FB_i in response to the second control signal $G_{SR2}$ and the output voltage $V_O$ (e.g. an error signal $V_{EA}$ indicative of the output voltage $V_O$); an isolate feedback unit OP, configured to generate a feedback output signal FB_o in response to the isolate feedback signal FB_i; and a primary circuit U2, configured to generate a primary control signal $G_{Q1}$ in response to the feedback output signal FB_o, to control the primary power switch Q1.

In one embodiment of the present invention, the switching mode power supply 1400 further comprises: a logical OR unit 13, configured to perform logical OR operation on the first control signal $G_{SR1}$ and the second control signal $G_{SR2}$, to generate the secondary control signal $G_{SR}$, to control the secondary switch circuit 101.

As can be seen from the above discussion, the switching mode power supply 1400 in FIG. 14 is similar as the switching mode power supply 500 in FIG. 5, with a difference that the feedback controller 14 in the switching mode power supply 1400 in FIG. 14 generates the isolate feedback signal FB_i in response to the output voltage $V_O$ and the second control signal $G_{SR2}$. When the ON process of the secondary switch circuit 101 under the control of the second control signal $G_{SR2}$ is over, i.e., the second ON process of 101 in one switching cycle is over, an edge jump arises at the isolate feedback signal FB_i. Accordingly, the feedback output signal FB_o also arises an edge jump, which is detected by the primary control circuit U2. Then the primary control circuit U2 generates a primary control signal $G_{Q1}$ to turned on the primary power switch Q1.

In addition, in the example of FIG. 14, a detailed circuit configuration of isolate feedback unit OP is schematically shown. As shown in FIG. 14, the isolate feedback unit OP comprises an optocoupler. However, one skilled in the art should realize that the isolate feedback unit OP may comprise other devices, such as isolate capacitor, magnetic isolator, isolate IC chip, etc.

The operation principle of the rest part of the switching mode power supply 1400 in FIG. 14 is similar as that of the switching mode power supply 500 in FIG. 5. That is, the current flows through the secondary switch circuit 101 twice in a switching cycle: at the first time, the secondary switch circuit 101 performs current freewheeling function after the primary power switch is turned off, which may be in response to a detection of a current flowing through the secondary switch circuit 101; and at the second time, the secondary switch circuit 101 is turned on to have the current flow therethrough in response to a trigger signal (e.g., a trigger signal generated by a switching frequency generator or generated by a valley detection circuit).

The operations of the feedback controller 14 and the primary control circuit U2 in the switching mode power supply in FIG. 14 are illustrated herein below with reference to FIGS. 15-18.

Figure 15:
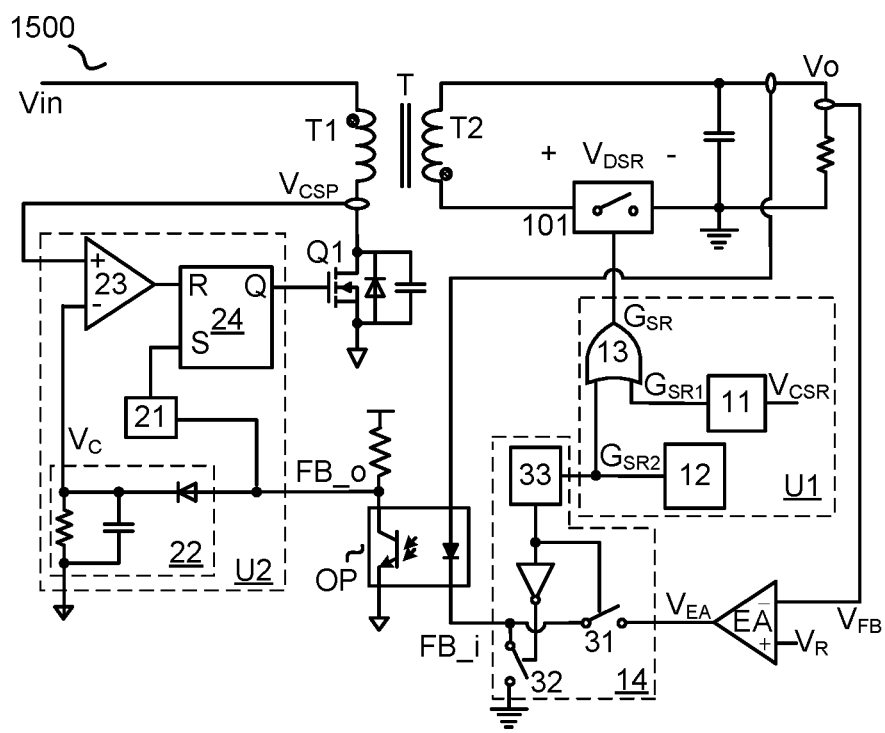
FIG. 15 schematically shows a switching mode power supply 1500 with a detailed circuit configuration of the feedback controller 14 and the primary control circuit U2 in accordance with an embodiment of the present invention.

Referring to FIG. 15, a switching mode power supply 1500 with a detailed circuit configuration of the feedback controller 14 and the primary control circuit U2 is illustrated in accordance with an embodiment of the present invention. In the example of FIG. 15, the feedback controller 14 comprises: a connect switch 31, configured to couple the error signal $V_{EA}$ and the isolate feedback signal FB_i; and a rest switch 32, configured to reset the isolate feedback signal FB_i when turned on; wherein: the connect switch 31 is turned off and the reset switch 32 is turned on for a set time length $T_{low}$, after the dead time delay since the second control signal $G_{SR2}$ turns off the secondary switch circuit 101 (i.e. since the secondary switch circuit 101's second ON process is over), so that the isolate feedback signal FB_i is pulled to ground within this set time length $T_{low}$; while the connect switch 31 keeps ON and the reset switch 32 keeps OFF outside the set time length $T_{low}$, so that the isolate feedback signal FB_i is recoupled to the error signal $V_{EA}$ (i.e., the isolate feedback signal FB_i follows the error signal $V_{EA}$) after the set time length $T_{low}$. Such control may be realized by the logical processor 33. The logical processor is configured to generate a pulse signal having the set time length $T_{low}$ in response to a falling edge of the second control signal $G_{SR2}$, to control the connect switch 31 and the reset switch 32. In one embodiment of the present invention, the logical processor 33 may comprise a monostable circuit generating the pulse signal.

The isolate feedback unit OP is configured to deliver the isolate feedback signal FB_i to its output port, and to reflect the variation of the isolate feedback signal FB_i at the feedback output signal FB_o.

In the example of FIG. 15, the primary control circuit U2 comprises a control unit. Specifically, the primary control circuit U2 comprises: a peak value detector 22, configured to detect a peak value of the feedback output signal FB_o, to generate a compensation signal $V_C$, to control the turning off of the primary power switch Q1; and an edge jump detector 21, configured to generate an edge detection signal by detecting the edge jump of the feedback output signal FB_o, to control the turning on of the primary power switch Q1. The compensation signal $V_C$ may be used to control the frequency of the switching mode power supply 1500, or the ON time length of the primary power switch Q1, or the peak current flowing through the primary power switch Q1, to control the turning off of the primary power switch Q1. In the example of FIG. 15, the compensation signal $V_C$ is used to control the peak current flowing through the primary power switch Q1. As shown in FIG. 15, the primary control circuit U2 further comprises: a current comparator 23, configured to generate a current comparison signal in response to a primary sense current $V_{CSP}$ indicative of the current flowing through the primary power switch Q1 and the compensation signal $V_C$; and a primary logical circuit 24, configured to generate the primary control signal $G_{Q1}$ in response to the current comparison signal and the edge detection signal.

Figure 16:
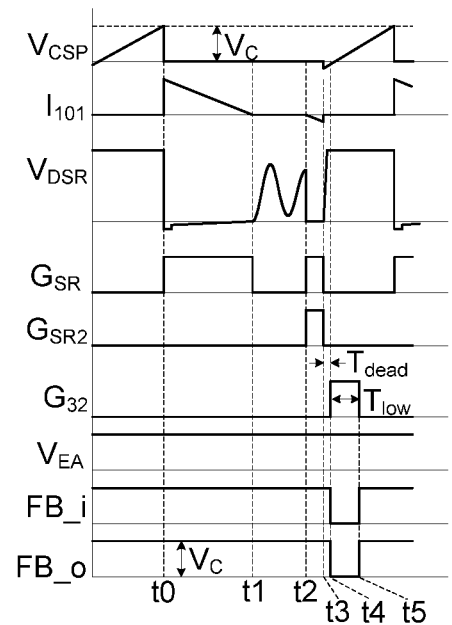
FIG. 16 schematically shows waveforms of the primary sense current $V_{CSP}$, the current $I_{101}$ flowing through the secondary switch circuit 101, the voltage $V_{DSR}$ across the secondary switch circuit 101, the secondary control signal $G_{SR}$, the second control signal $G_{SR2}$, the control signal $G_{32}$ of the reset switch 32, the error signal $V_{EA}$, the isolate feedback signal FB_i and the feedback output signal FB_o in accordance with an embodiment of the present invention.

FIG. 16 schematically shows waveforms of the primary sense current $V_{CSP}$, the current $I_{101}$ flowing through the secondary switch circuit 101, the voltage $V_{DSR}$ across the secondary switch circuit 101, the secondary control signal $G_{SR}$, the second control signal $G_{SR2}$, the control signal $G_{32}$ of the reset switch 32, the error signal $V_{EA}$, the isolate feedback signal FB_i and the feedback output signal FB_o. At time point t3, the second ON process of the secondary switch circuit 101 is over, i.e., $G_{SR2}$ turns to low from high. This falling edge is detected by the feedback controller 14. Then, after a dead time period $T_{dead}$ (i.e. at time point t4), the connect switch 31 is turned off, and the reset switch 32 is turned on, until time point t5, which lasts for a time length of $T_{low}$. The isolate feedback signal FB_i is reset during this t4-t5 interval, and the feedback output signal FB_o is pulled low accordingly. Then the reset switch 32 is turned off, and the connect switch is turn on back, causing the isolate feedback signal FB_i to follow the error signal $V_{EA}$ again. That is, the primary control circuit U2 is configured to turn on the primary power switch Q1 in response to the edge jump of the FB_o. The current flowing through the primary power switch Q1 increases linearly. When the primary sense current $V_{CSP}$ increases to compensation signal $V_C$, the primary power switch Q1 is turned off.

Several embodiments of the forgoing switching mode power supply have control circuit in the secondary side. The feedback output signal FB_o, which contains both the error signal information used to control the turning off of the primary power switch Q1 and the information used to control the turning on of the primary power switch Q1, is delivered through the isolate feedback unit OP. That is, several embodiments of the forgoing switching mode power supply realize the primary control via one signal: the feedback output signal FB_o not only reflects the error signal $V_{EA}$, which controls the turning off of the primary power switch Q1, but also reflects the time point when the voltage across the primary power switch Q1 falls to zero, at which time point the primary power switch is turned on, so as to achieve zero voltage switch, to lower the power loss.

Figure 17:
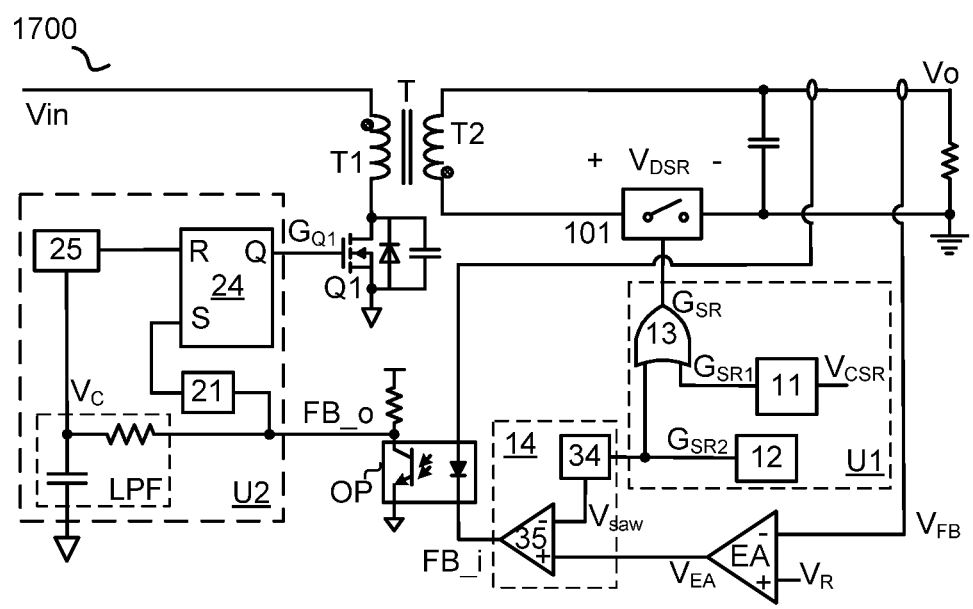
FIG. 17 schematically shows a switching mode power supply 1700 with another circuit configuration of the feedback controller 14 and the primary control circuit U2 in accordance with an embodiment of the present invention.

Referring to 17, a switching mode power supply 1700 with another circuit configuration of the feedback controller 14 and the primary control circuit U2 is illustrated in accordance with an embodiment of the present invention. In the example of FIG. 17, the feedback controller 14 comprises: a triangle wave generator 34, configured to generate a triangle wave signal $V_{saw}$, the triangle wave signal $V_{saw}$ having a frequency determined by the second secondary signal generator 12, with a start time point from the end of the secondary switch circuit's second ON process plus the dead time; and a feedback comparator 35, configured to generate the isolate feedback signal FB_i by comparing the triangle wave signal $V_{saw}$ with the error signal $V_{EA}$.

In the example of FIG. 7, the primary control circuit U2 includes control units. Specifically, the primary control circuit U2 comprises: a low pass filter LPF, configured to generate the compensation signal $V_C$ to control the turning off of the primary power switch Q1 by filtering the feedback output signal FB_o; and an edge jump detector 21, configured to detect the edge jump of the feedback output signal FB_o to control the turning on of the primary power switch Q1. The compensation signal $V_C$ may be used to control the frequency of the switching mode power supply, or the ON time length of the primary power switch Q1, or the peak current flowing through the primary power switch Q1. In the example of FIG. 17, the compensation signal $V_C$ is used to control the ON time length of the primary power switch Q1. As shown in FIG. 17, the primary control circuit U2 further comprises: a constant on timer 25, configured to generate a constant on time signal in response to the compensation signal $V_C$; and a primary logical circuit 24, configured to generate the primary control signal $G_{Q1}$ in response to the constant on time signal and the edge jump detection.

In one embodiment of the present invention, the primary logical circuit 24 comprises a RS flip flop. When the edge jump arises at the feedback output signal FB_o, the primary logical circuit 24 is set and the primary power switch Q1 is turned on; and when the on time of the primary power switch Q1 reaches the on time length determined by the compensation signal $V_C$, the primary logical circuit 24 is reset and the primary power switch Q1 is turned off.

FIG. 18 schematically shows the waveforms of the error signal $V_{EA}$, the triangular wave signal $V_{saw}$, the isolate feedback signal FB_i, and the feedback output signal FB_o in the example of FIG. 17. The coordination operation principle between the primary side and the secondary side of the switching mode power supply 1700 would be illustrated herein below with reference to FIG. 18.

The isolate feedback signal FB_i with a certain duty cycle is generated by comparing the error signal $V_{EA}$ with the triangular wave signal $V_{saw}$, to drive a diode part of the optocoupler OP, which turns to the feedback output signal FB_o via a transistor part of the optocoupler OP. Then the compensation signal $V_C$ is generated by way of the low pass filter LPF. Because the duty cycle of the feedback output signal FB_o is proportional to the amplitude of the error signal $V_{EA}$, and the compensation signal $V_C$ is equal to an average value of FB_o, the compensation signal $V_C$ reflects the error signal $V_{EA}$. In the example of FIG. 8, the compensation signal $V_C$ is used to control the ON time length of the primary power switch Q1, to control the turning off time point of the primary power switch Q1. However, one skilled in the art should realize that the compensation signal may also be used to control the peak current flowing through the primary power switch Q1 (e.g., the embodiment in FIG. 15), or to control the frequency of the switching mode power supply.

The edge jump of the feedback output signal FB_o is detected by the edge jump detector 21. When an edge jump (e.g., a rising edge jump) arises, the primary power switch Q1 is turned on.

In one embodiment of the present invention, the triangular wave generator 34 may be replaced by a saw-tooth wave generator configured to generate a saw-tooth wave signal. The saw-tooth wave signal increases to the error signal $V_{EA}$ from zero since the time point when the primary power switch Q1 is turned on. Then the saw-tooth wave signal falls to zero and keeps zero, until the system enters a new switching cycle, i.e., until the primary power switch Q1 is turned on at the next switching cycle. Then saw-tooth signal restarts to increase from zero.

The forgoing embodiments in FIG. 15 and FIG. 17 show the relation between the feedback output signal FB_o, the error signal $V_{EA}$, and the switching actions of the secondary switch circuit 101. However, one skilled in the art should realize that the error signal information and the switching actions of the secondary switch circuit 101 may be delivered to the feedback output signal by other forms, e.g., by serial communication: an amplitude of the error signal is delivered to the primary side of the transformer in the form of code, which is received at the primary control circuit; then the code is restored to the error signal (e.g., by way of digital-to-analog conversion), to control the switching actions of the primary power switch.

FIG. 19 schematically shows a switching mode power supply 1900 in accordance with an embodiment of the present invention. In the example of FIG. 19, the switching mode power supply comprises: a primary power switch Q1, coupled to a primary side T1 of an electrical isolation device T, the primary power switch Q1 being periodically turned on and off, to deliver an input voltage Vin into a secondary side T2 of the electrical isolation device T; a secondary switch circuit 101, coupled to the secondary side T2 of the electrical isolation device T, the secondary switch circuit 101 being periodically turned on and off, to provide a desired output voltage $V_O$; a first secondary signal generator 11, configured to generate a first control signal $G_{SR1}$ in response to a current sense signal $V_{CSR}$ indicative of a current flowing through the secondary switch circuit 101; a second secondary signal generator 12, configured to generate a second control signal $G_{SR2}$ in response to the output voltage $V_O$, the first control signal $G_{SR1}$ and the second control signal $G_{SR2}$ both being used to control the secondary switch circuit 101; a feedback controller 14, configured to generate an isolate feedback signal FB_i in response to the second control signal; an isolate feedback unit OP, configured to generate a feedback output signal FB_o in response to the isolate feedback signal FB_i; and a primary circuit U2, configured to generate a primary control signal $G_{Q1}$ in response to the feedback output signal FB_o, to control the primary power switch Q1.

In one embodiment of the present invention, the switching mode power supply 1900 further comprises: a logical OR circuit 13, configured to generate a control signal $G_{SR}$ by performing a logical OR operation on the first control signal $G_{SR1}$ and the second control signal $G_{SR2}$, to control the secondary switch circuit 101.

In one embodiment of the present invention, when the current sense signal $V_{CSR}$ indicates a current is flowing through the secondary switch circuit 101, the first control signal $G_{SR1}$ is operable to turn on the secondary switch circuit 101; and when the current sense signal $V_{CSR}$ indicates the current flowing through the secondary switch circuit 101 falls to zero, the first control signal $G_{SR1}$ is operable to turn off the secondary switch circuit 101.

In the example of FIG. 19, the second secondary signal generator 12 is configured to generate the second control signal $G_{SR2}$ in response to the error signal $V_{EA}$ indicative of the output voltage $V_O$. The second control signal $G_{SR2}$ has a frequency determined by the error signal $V_{EA}$. The frequency of the second control signal $G_{SR2}$ and the error signal $V_{EA}$ may have a relationship as shown in the left side (a) of FIG. 11, or as shown in the middle part (b) of FIG. 11, or as shown in the right side (c) in FIG. 11. The feedback controller 14 generates the isolate feedback signal FB_i having a same frequency of the second control signal $G_{SR2}$, and an edge jump arises after the dead time delay since the second control signal $G_{SR2}$ turns off the secondary switch circuit 101. The isolate feedback signal FB_i is converted to the feedback output signal FB_o with a same frequency and a synchronous edge jump by way of the isolate feedback unit OP. The primary control circuit U2 is operable to control the turning on of the primary power switch Q1 by detecting the edge jump of the feedback output signal FB_o, and to control the turning off of the primary power switch Q1 based on the frequency of the feedback output signal FB_o.

Figure 20:
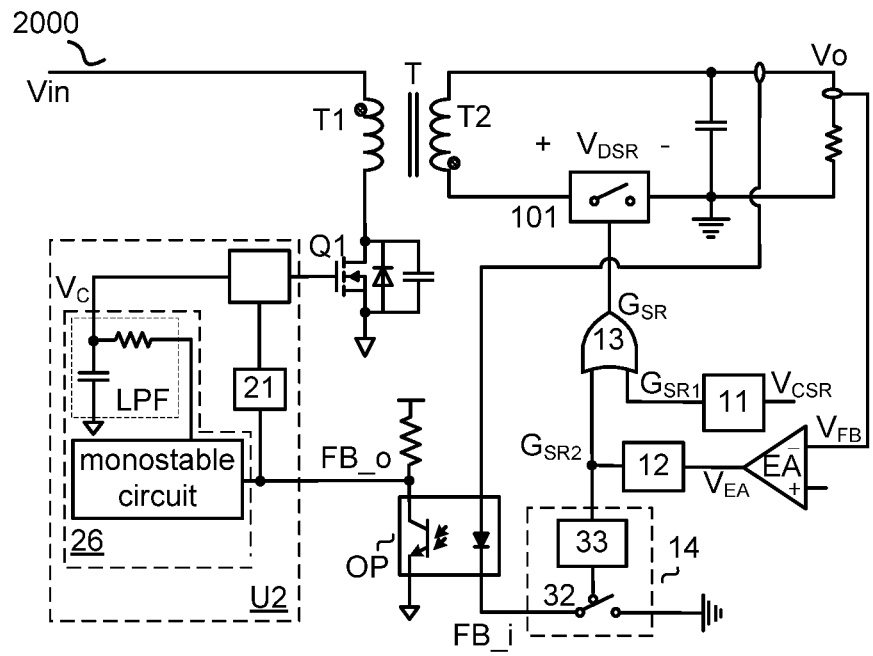
FIG. 20 schematically shows a switching mode power supply 2000 with a detailed circuit configuration of the isolate feedback unit OP, the feedback controller 14 and the primary control circuit U2 in accordance with an embodiment of the present invention.

FIG. 20 schematically shows a switching mode power supply 2000 with a detailed circuit configuration of the isolate feedback unit OP, the feedback controller 14 and the primary control circuit U2 in accordance with an embodiment of the present invention. Specifically, in the example of FIG. 20, the isolate feedback unit OP comprises an optocoupler. The feedback controller 14 comprises: a logical processor 33, configured to generate a pulse signal with a set time length $T_{low}$ in response to a falling edge of the second control signal $G_{SR2}$; and a reset switch 32, configured to be OFF within the set time length $T_{low}$ in response to the pulse signal, and to be ON in the rest of the time. The primary control circuit U2 comprises: a frequency to voltage converter 26, configured to generate the compensation signal $V_C$ in response to the frequency of the feedback output signal FB_o, to control the turning off of the primary power switch Q1; and an edge jump detector 21, configured to detect the edge jump of the feedback output signal FB_o to control the turning on of the primary power switch Q1. The compensation signal $V_C$ is then used to control the frequency of the switching mode power supply 1100, or to control the ON length of the primary power switch Q1 (e.g., at the example of FIG. 17), or to control the peak current flowing through the primary power switch Q1 (e.g., at the example of FIG. 15).

In one embodiment of the present invention, the frequency to voltage converter 26 comprises: a monostable circuit, configured to generate a pulse signal in response to the feedback output signal FB_o; and a low pass filter LPF, configured to generate the compensation signal $V_C$ by filtering the pulse signal.

Figure 21:
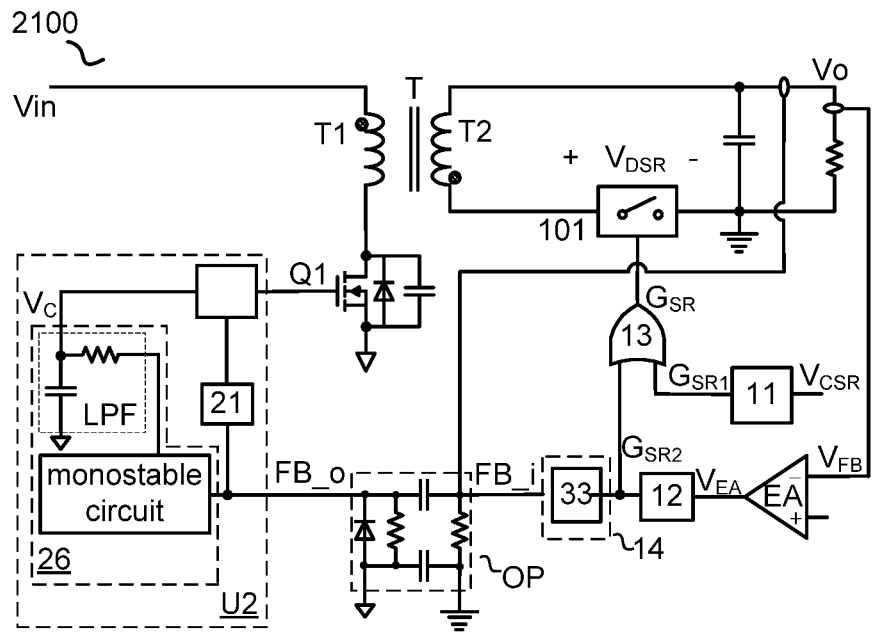
FIG. 21 schematically shows a switching mode power supply 2100 with another detailed circuit configuration of the isolate feedback unit OP, the feedback controller 14 and the primary control circuit U2 in accordance with an embodiment of the present invention.

FIG. 21 schematically shows a switching mode power supply 2100 with another detailed circuit configuration of the isolate feedback unit OP, the feedback controller 14 and the primary control circuit U2 in accordance with an embodiment of the present invention. Specifically, in the example of FIG. 21, the isolate feedback unit OP comprises an isolate capacitor. The feedback controller 14 comprises: a logical processor 33, configured to generate the isolate feedback signal FB_i in the form of a series of pulse signals in response to a falling edge of the second control signal $G_{SR2}$. The primary control circuit U2 comprises: a frequency to voltage converter 26, configured to generate the compensation signal $V_C$ in response to the frequency of the feedback output signal FB_o, to control the turning off of the primary power switch Q1; and an edge jump detector 21, configured to detect the edge jump of the feedback output signal FB_o to control the turning on of the primary power switch Q1. The compensation signal $V_C$ is then used to control the frequency of the switching mode power supply 1100, or to control the ON length of the primary power switch Q1 (e.g., at the example of FIG. 17), or to control the peak current flowing through the primary power switch Q1 (e.g., at the example of FIG. 15).

In one embodiment of the present invention, the frequency to voltage converter 26 comprises: a monostable circuit, configured to generate a pulse signal in response to the feedback output signal FB_o; and a low pass filter LPF, configured to generate the compensation signal $V_C$ by filtering the pulse signal.

Figure 22:
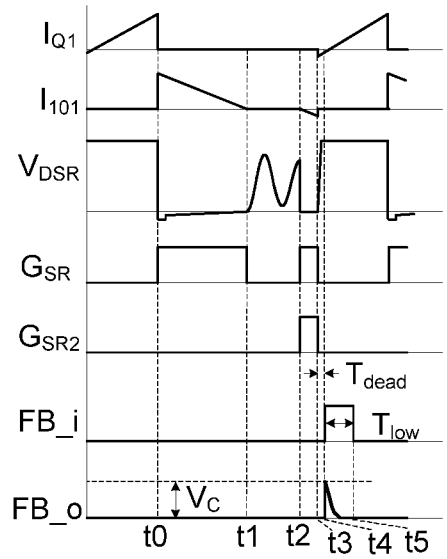
FIG. 22 schematically shows the waveforms of the current $I_{Q1}$ flowing through the primary power switch Q1, the current $I_{101}$ flowing through the secondary switch circuit 101, the voltage $V_{DSR}$ drop the secondary switch circuit 101, the secondary control signal $G_{SR}$, the second control signal $G_{SR2}$, the isolate feedback signal FB_i, and the feedback output signal FB_o in accordance with an embodiment of the present invention.

FIG. 22 schematically shows the waveforms of the current $I_{Q1}$ flowing through the primary power switch Q1, the current $I_{101}$ flowing through the secondary switch circuit 101, the voltage $V_{DSR}$ drop the secondary switch circuit 101, the secondary control signal $G_{SR}$, the second control signal $G_{SR2}$, the isolate feedback signal FB_i, and the feedback output signal FB_o.

Figure 23:
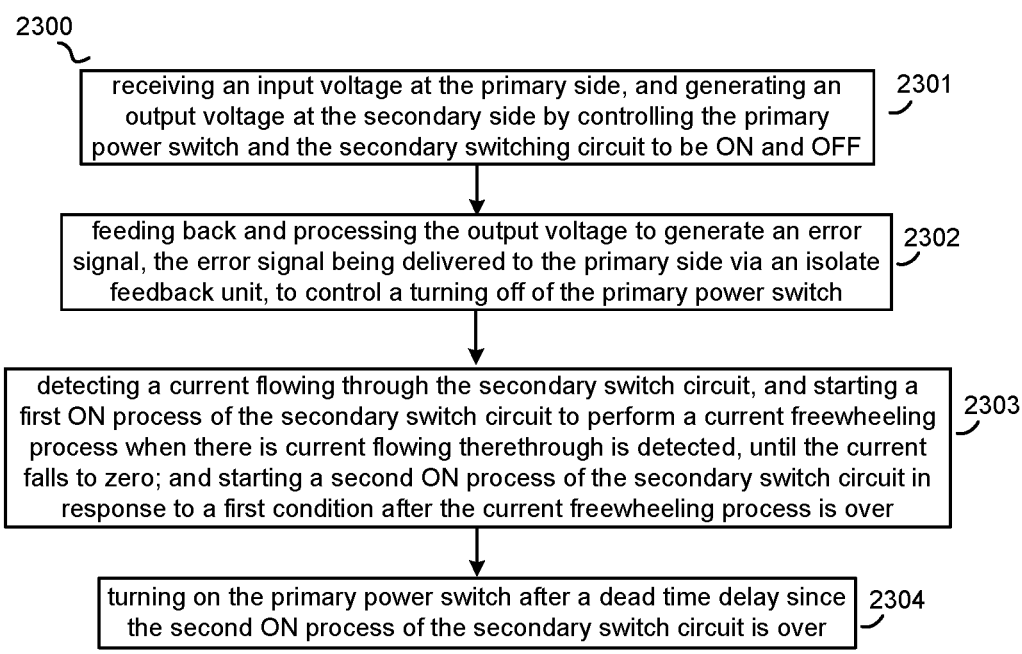
FIG. 23 schematically shows a flowchart 2300 of a method used in a switching mode power supply in accordance with an embodiment of the present invention.

FIG. 23 schematically shows a flowchart 2300 of a method used in a switching mode power supply in accordance with an embodiment of the present invention. The switching mode power supply includes: a primary power switch coupled to a primary side of an electrical isolation device, and a secondary switch circuit coupled to a secondary side of the electrical isolation device. The method comprising:

Step 2301, receiving an input voltage at the primary side, and generating an output voltage at the secondary side by controlling the primary power switch and the secondary switch circuit to be ON and OFF.

Step 2302, feeding back and processing the output voltage to generate an error signal, the error signal being delivered to the primary side via an isolate feedback unit, to control a turning off of the primary power switch. In one embodiment of the present invention, the error signal is used to control an on time length of the primary power switch. In other embodiments of the present invention, the error signal is used to control a peak current flowing through the primary power switch.

Step 2303, detecting a current flowing through the secondary switch circuit, and turning on the secondary switch circuit to perform a current freewheeling process when there is current flowing therethrough is detected, until the current falls to zero; and turning on the secondary switch circuit once again in response to a first condition after the current freewheeling process is over. In one embodiment of the present invention, the first condition comprises when a voltage across the secondary switch circuit is lower than a threshold voltage. In another embodiment of the present invention, the first condition comprises when the switching cycle reaches a set cycle or reaches a cycle determined by the error signal. And Step 2304, turning on the primary power switch after a dead time delay since the second ON process of the secondary switch circuit is over, the secondary switch circuit's second ON process being over in response to a second condition. In one embodiment of the present invention, the primary power switch is turned in response to following condition: generating an edge jump at the isolate feedback circuit after the dead time delay since the second ON process of the secondary switch circuit is over; and turning on the primary power switch in response to the edge jump.

In one embodiment of the present invention, the second condition comprises: when the on time length of the secondary switch circuit reaches a time length set by a monostable circuit. In another embodiment of the present invention, the second condition comprises: when the current flowing through the secondary switch circuit reaches a peak current value.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A switching mode power supply, comprising:
a primary power switch, coupled to a primary side of an electrical isolation device, the primary power switch being periodically turned on and off, to deliver an input voltage into a secondary side of the electrical isolation device;
a secondary switch circuit, coupled to a secondary side of the electrical isolation device, the secondary switch circuit being periodically turned on and off, to provide a desired output voltage;
a first secondary signal generator, configured to detect a current flowing through the secondary switch circuit, and to control the secondary switch circuit to freewheel the current when the current flowing therethrough is detected, until a current freewheeling process is over; and
a second secondary signal generator, configured to generate a control signal to control the secondary switch circuit to be turned on once again after the current freewheeling process is over and before the primary power switch is turned on at a next switching cycle; wherein the second secondary signal generator is configured to control the secondary switch circuit to be turned on once again in response to a trigger condition, and wherein the trigger condition comprises:
a present switching cycle reaches a reference switching cycle; or
a voltage drop across the secondary switch circuit is lower than a set threshold.

2. The switching mode power supply of claim 1, further comprising:
a feedback controller, configured to generate an isolate feedback signal in response to the output voltage;
an isolate feedback unit, configured to generate a feedback output signal in response to the isolate feedback signal; and
a primary control circuit, configured to generate a primary control signal in response to the feedback output signal, to control the primary power switch.

3. The switching mode power supply of claim 2, wherein:
after a dead time delay since the control signal controls the secondary switch circuit to be turned off, the isolate feedback signal is operable to arise an edge jump, to control the primary power switch to be turned on.

4. The switching mode power supply of claim 2, wherein:
when the control signal controls the secondary switch circuit to be turned off, the isolate feedback signal is operable to arise an edge jump, to control the primary power switch to be turned on.

5. The switching mode power supply of claim 1, wherein:
the secondary switch circuit is controlled to be ON once again in one switching cycle for a set time length, or for a time length determined by a peak current flowing through the secondary switch circuit.

6. The switching mode power supply of claim 1, further comprising:
a feedback controller, configured to generate an isolate feedback signal in response to the control signal;
an isolate feedback unit, configured to generate a feedback output signal in response to the isolate feedback signal; and
a primary control circuit, configured to generate a primary control signal in response to the feedback output signal, to control the primary power switch.

7. The switching mode power supply of claim 6, wherein:
the isolate feedback signal having a same frequency of the control signal.

8. A switching mode power supply, comprising:
a primary power switch, coupled to a primary side of an electrical isolation device, the primary power switch being periodically turned on and off, to deliver an input voltage into a secondary side of the electrical isolation device;
a secondary switch circuit, coupled to a secondary side of the electrical isolation device, the secondary switch circuit being periodically turned on and off, to provide a desired output voltage; and
a secondary control circuit, configured to provide a secondary control signal, to control the secondary switch circuit i) to start a first ON process to freewheel the current when the primary power switch is turned off, until a current freewheeling process is over; and ii) to start a second ON process in one switching cycle after the current freewheeling process is over and before the primary power switch is turned on at a next switching cycle; wherein the primary power switch is turned on at the next switching cycle after a dead time delay since the secondary switch circuit's second ON process is over; wherein the secondary control generator comprises:
a first secondary signal generator, configured to detect a current flowing through the secondary switch circuit, to start the secondary switch circuit's first ON process when the current flowing therethrough is detected; and
a second secondary signal generator, configured to start the secondary switch circuit's second ON process in response to a trigger condition, and wherein the trigger condition comprises: a present switching cycle of the switching mode power supply reaches a reference switching cycle; or a voltage drop across the secondary switch circuit is lower than a set threshold.

9. The switching mode power supply of claim 8, further comprising:
a feedback controller, configured to generate an isolate feedback signal in response to the output voltage;
an isolate feedback unit, configured to generate a feedback output signal in response to the isolate feedback signal; and
a primary control circuit, configured to generate a primary control signal in response to the feedback output signal, to control the primary power switch.

10. The switching mode power supply of claim 9, wherein:
after the dead time delay since the secondary switch circuit's second ON process is over, the isolate feedback signal is operable to arise an edge jump, to control the primary power switch to be turned on.

11. The switching mode power supply of claim 8, further comprising:
a feedback controller, configured to generate an isolate feedback signal in response to the secondary switch circuit's second ON process;
an isolate feedback unit, configured to generate a feedback output signal in response to the isolate feedback signal; and
a primary control circuit, configured to generate a primary control signal in response to the feedback output signal, to control the primary power switch.

12. The switching mode power supply of claim 11, wherein the secondary switch circuit's second ON process lasts for a set time length, and wherein: the isolate feedback signal is pulled to ground within the set time length, and the isolate feedback signal follows an error signal indicative of the output voltage after the set time length.

13. A method used in a switching mode power supply, the switching mode power supply including a primary power switch coupled to a primary side of an electrical isolation device, and a secondary switch circuit coupled to a secondary side of the electrical isolation device, the method comprising:

receiving an input voltage at the primary side, and generating an output voltage at the secondary side by controlling the primary power switch and the secondary switch circuit to be ON and OFF;

feeding back and processing the output voltage to generate an error signal, the error signal being delivered to the primary side via an isolate feedback unit, to control a turning off of the primary power switch;

detecting a current flowing through the secondary switch circuit, and starting a first ON process of the secondary switch circuit to perform a current freewheeling process when there is current flowing therethrough is detected, until the current falls to zero; and starting a second ON process of the secondary switch circuit in response to a first condition after the current freewheeling process is over; and turning on the primary power switch after a dead time delay since the second ON process of the secondary switch circuit is over; wherein the second ON process of the secondary switch circuit is started when a voltage across the secondary switch circuit is lower than a threshold voltage, or when a switching cycle of the switching mode power supply reaches a set cycle or reaches a cycle determined by the error signal; and the second ON process of the secondary switch circuit is over when an on time length reaches a set time length or when the current flowing through the secondary switch circuit reaches a peak current value.

14. The method of claim 13, further comprising:

generating an edge jump at the isolate feedback circuit in after the dead time delay since the second ON process of the secondary switch circuit is over; and turning on the primary power switch in response to the edge jump.

* * * * *